United States Patent

[11] 3,571,712

[72] Inventors George A. Hellwarth
Deerfield Beach, Fla.;
Gardner D. Jones, Jr., Raleigh, N.C.

[21] Appl. No. 846,082
[22] Filed July 30, 1969
[45] Patented Mar. 23, 1971
[73] Assignee International Business Machines Corporation
Armonk, N.Y.

[54] DIGITAL FSK/PSK DETECTOR
6 Claims, 6 Drawing Figs.

[52] U.S. Cl. .......... 325/320, 178/88
[51] Int. Cl. .......... H04b 1/16
[50] Field of Search .......... 178/66, 67, 88; 179/15, 15 (AW); 325/30, 320; 328/140; 235/150.3, 150.31

[56] References Cited
UNITED STATES PATENTS

| | | | |
|---|---|---|---|
| 3,505,470 | 4/1970 | Gorog .......... | 325/30 |
| 3,514,702 | 5/1970 | Nahay et al. .......... | 325/30 |

*Primary Examiner*—Robert L. Griffin
*Assistant Examiner*—Albert J. Mayer
*Attorney*—Hanifin and Jancin and Edward M. Suden

ABSTRACT: The digital FSK/PSK detector demodulates digital data from a frequency shift keyed modulation signal (FSK) or a phase shift keyed modulation signal (PSK) for moderate data rates including at least 1200 bits per second and is capable of operating over switching networks. The digital FSK/PSK detector comprises a binary amplitude quantizer, a clock, a digital time quantizer, a digital delay coacting with an Exclusive-OR circuit for detecting the digital data signal from the FSK/PSK modulated signal and a digital filter and smoothing circuit for eliminating undesirable noise from the digital data signal.

INVENTORS
GEORGE A. HELLWARTH
GARDNER D. JONES, JR.

BY Edward M. Suden
AGENT

DIGITAL FSK/PSK DETECTOR

BACKGROUND OF THE INVENTION

1. Field of the Invention

This invention relates to subject matter relating to the demodulation of a frequency shift keyed or phase shift keyed modulated signal. More specifically, the invention relates to a digital frequency shift keyed or phase shift keyed detector.

2. Prior Art

Frequency shift keying (FSK) and phase shift keying (PSK) are modulation techniques commonly used for the transmission of digital data. Teachings to the theory of frequency modulation systems and phase modulation systems can be found in chapters 10 and 11 respectively of the book DATA TRANSMISSION, William R. Bennett and James R. Davey, McGraw-Hill, Inc., 1965. The theory of frequency and phase modulation will not be discussed in view of the cited teaching.

The digital FSK/PSK detector provides a means for demodulating a digital data signal for moderate data rates, including at least 1200 bits per second and capable of operating over switching networks. The prior art differential-coherent phase detector was subject to the perennial problem of overcoming the effects on transmission accuracy of such factors as noise and delay.

The analogue differential-coherent phase detectors employed either passive or active filters for the rejection of noise. However, the analogue differential-coherent phase detectors tended to be temperature sensitive and required adjustments or tuning due to the common use of direct-current amplifiers within such detectors.

Prior art digital differential-coherent phase detectors as basically inexpensive, use less components, and are more stable with temperature then their analogue counterparts, but are more sensitive to noise. In order to keep the signal-to-noise rejection ratio to an acceptable level, the prior art digital differential-coherent phase detectors have gone to a hybrid design by incorporating an analogue-type filter at the output of the phase detector. A second approach for increasing the signal-to-noise rejection ratio of the digital differential-coherent phase detector has been to abandon the advantage of cost and simplicity by designing highly sophisticated and expensive digital detection systems.

Therefore, an object of the present invention is to provide a new, inexpensive and relatively simple digital differential-coherent phase detector with acceptable noise rejection without incorporating an analogue filter.

Another object of the invention is to provide a digital differential-coherent phase detector capable of demodulating both frequency shift keyed modulated signal and phase shift keyed modulated signals.

SUMMARY OF THE INVENTION

The invention relates to a digital FSK/PSK detector which in essence is a differential-coherent phase detector. The FSK or PSK signal is received and inputted to a binary amplitude quantizer means for converting the FSK or PSK to a two level FSK/PSK signal having the same polarity and zero crossing as the inputted FSK/PSK signal. The amplitude quantized FSK/PSK signal is then inputted into a time quantizer means for synchronizing the zero crossing of the amplitude quantized FSK/PSK signal with a clock means. The amplitude quantized and time quantized FSK/PSK signal is then entered into a digital delay means which delays the inputted signal for a specified time interval. The amplitude quantized and time quantized FSK/PSK signal is compared with the delayed amplitude quantized and time quantized FSK/PSK signal by an Exclusive-OR circuit, the output of the Exclusive-OR circuit being a derived data signal that was originally encoded by the received FSK/PSK signal. The derive data signal is then inputted into a digital filter and smoothing means for eliminating undesirable noise from the derived data signal.

One advantage of the digital FSK/PSK detector is that while being inexpensive and simple in construction, the detector does not go to hybrid techniques of incorporating an analogue filter at its output for eliminating undesirable noise.

Another advantage of the digital FSK/PSK detector is that it may be used wherever a differential-coherent phase detector can be employed on either frequency or phase modulated signals whenever amplitude quantizing of the input signal is allowed.

A further advantage of the digital FSK/PSK detector is that while it may be used for data transmission, it may also be used for the recovery of data from magnetic recordings on discs and tape for these FSK or PSK modulation must be used due to the band-pass frequency response of the record/playback process.

BRIEF DESCRIPTION OF THE DRAWINGS

The foregoing and other objects, features and advantages of the invention will be apparent from the foregoing and more particular description of the preferred embodiment of the invention, as illustrated in the accompanying drawings.

In the Drawings

DETAILED DESCRIPTION OF THE PREFERRED EMBODIMENT

Figure 1:
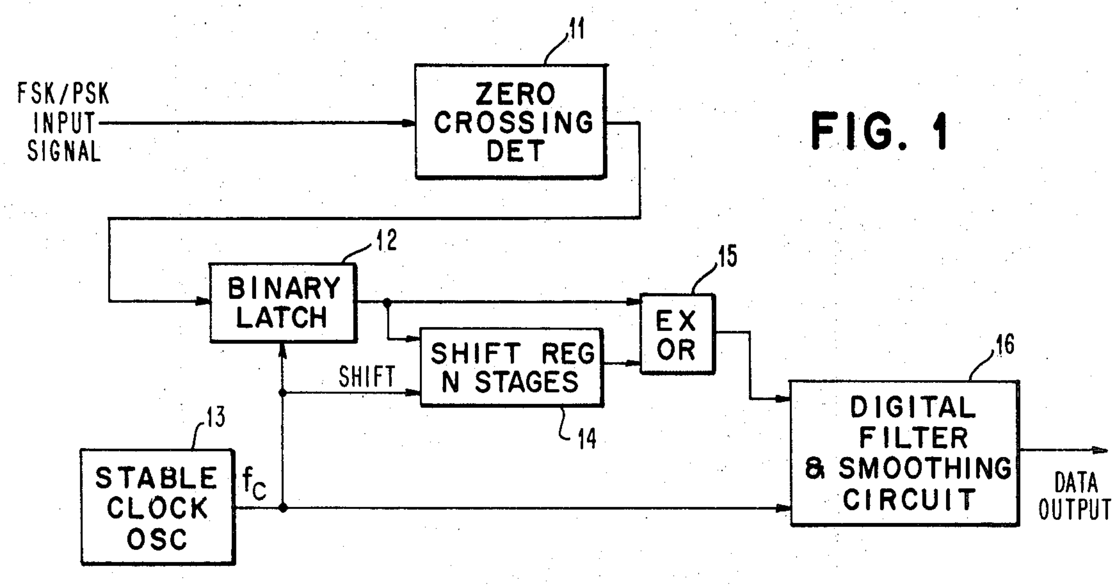
FIG. 1 shows the preferred embodiment of the digital FSK/PSK detector.

The digital FSK/PSK detector is a differential-coherent phase detector for the demodulation of frequency or phase modulated signals. With reference to FIG. 1, the FSK/PSK signal is received and is inputted to a binary amplitude quantizer means.

The binary amplitude quantizer means is a zero crossing detector 11 which converts the FSK/PSK input signal into a bilevel signal having the same polarity and zero crossing as the FSK/PSK input signal. A zero crossing detector is a specific type limiter extensively used in prior art digital differential-coherent phase detectors. The output of the zero crossing detector 11 is a binary amplitude quantized FSK/PSK signal which is inputted into a digital time quantizer means.

The digital binary time quantizer means is a binary latch 12 which is strobed by means of the clock pulse from the stable clock oscillator 13 to the value of the binary amplitude quantized FSK/PSK signal that is present at the input of the binary latch 12 when a clock pulse from the stable clock oscillator 13 is inputted into the binary latch 12. The output of binary latch 12 is a binary amplitude quantized and digital time quantized FSK/PSK signal.

It should be noted that binary latches, shift registers, Exclusive-OR circuits, up-down counters and circuits, OR circuits and inverter circuits are all well-known circuits within the art. A ready reference for such circuits is the book PULSE AND DIGITAL CIRCUITS, Millman and Taub, McGraw-Hill, 1956.

The binary amplitude quantized and digital time quantized FSK/PSK signal is inputted from binary latch 12 into a digital delay means. The digital delay means is shift register 14. Shift register 14 has N stages and is shifted by clock pulses from stable clock oscillator 13. The time delay of the digital delay means is therefore equal to the number of stages of shift register 14 (N) divided by the clock frequency $f_c$ of the stable clock oscillator 13. The output of shift register 14 is inputted to one of the inputs of Exclusive-OR circuit 15.

Exclusive-OR circuit 15 has as its second input the output of binary latch 12. Exclusive-OR 15 combines the binary amplitude quantized and digital time quantized FSK/PSK signal with the delayed binary amplitude quantized and digital time quantized FSK/PSK signal to derive an output data signal. The output data signal from Exclusive-OR 15 is inputted to a digital filter and smoothing circuit 16.

Digital filter and smoothing circuit 16 are used to eliminate undesirable noise components from the derived data signal from the Exclusive-OR 15. Digital filter and smoothing circuit 16 receives clock pulses from stable clock oscillator 13.

Figure 2:
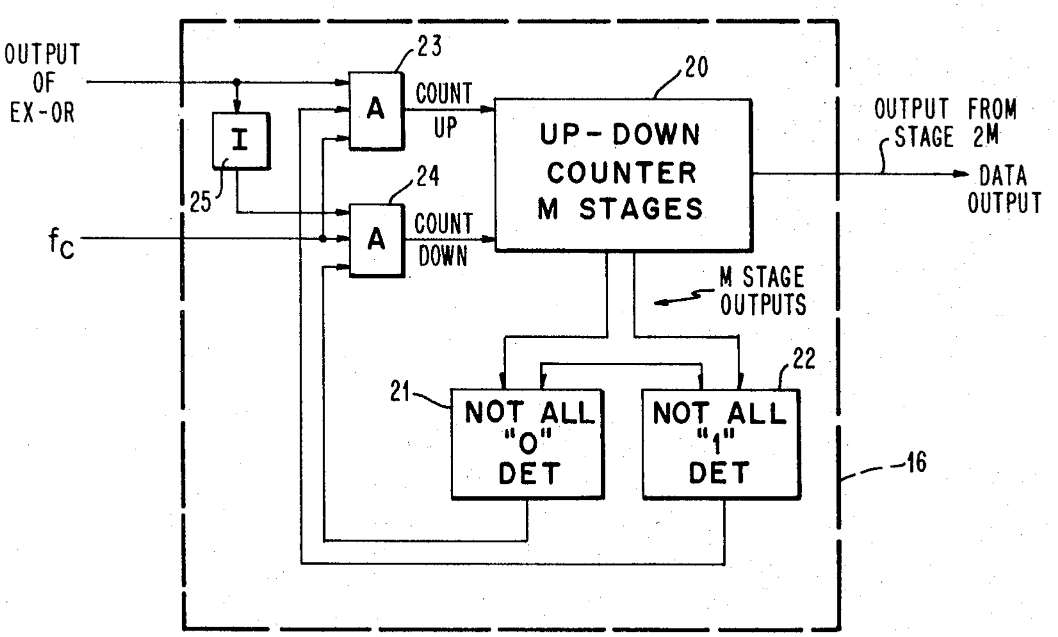
FIG. 2 shows an up-down counter-type of digital filter and smoothing circuit of FIG. 1.

With reference to FIG. 2, a first type of digital filter and smoothing circuit 16 is shown. This first type of digital filter and smoothing circuit 16 is comprised of an up-down counter 20 having M stages and control circuitry which prevents the counter from overrunning in either direction. The control circuitry comprises a not all 0 detector 21, a not all 1 detector 22, AND circuits 23 and 24, and inverter 25. Detectors 21 and 22 are each comprised of an M input AND for sensing the condition of each of the M stages of the up-down counter 20 and an inverter for inverting the output of the M input AND. AND circuit 23 controls the counting up of the up-down counter 20 and has a first input from the output of Exclusive-OR 15, a second input from the stable clock oscillator 13 and a third input from the detector 22. AND circuit 23 will follow the clock frequency $f_c$ of stable clock oscillator 13 whenever the output of Exclusive-OR 15 is a logical 1 and the count within the up-down counter 20 does not contain all 1's as indicated by detector 22.

The output of Exclusive-OR circuit 15 is inverted by inverter 25. AND circuit 24 has a first input from inverter 25, a second input from the stable clock oscillator 13 and a third input from detector 21 and controls the counting down of the up-down counter 20. Up-down counter 20 will count down whenever the output of the Exclusive-OR 15 is a logical 0 and the M stages of the up-down counter 20 do not contain all 0's at a rate of the clock frequency of the stable clock oscillator 13.

Figure 3:
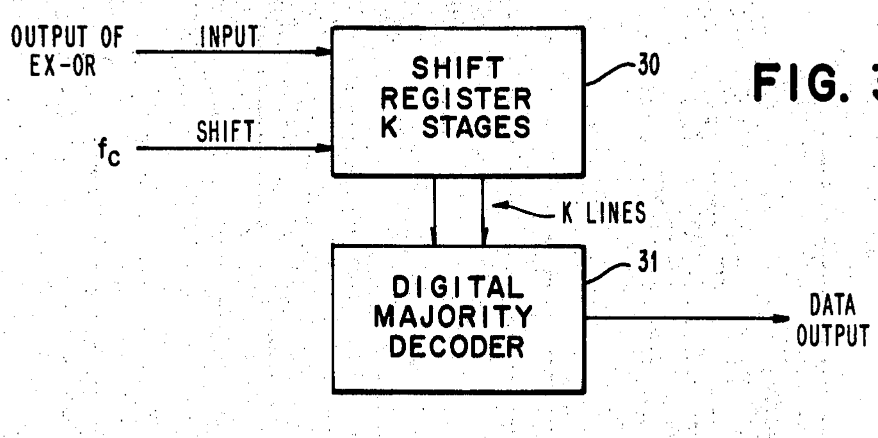
FIG. 3 shows a digital majority decoder-type of digital filter and smoothing circuit of FIG. 1.
Figure 4:
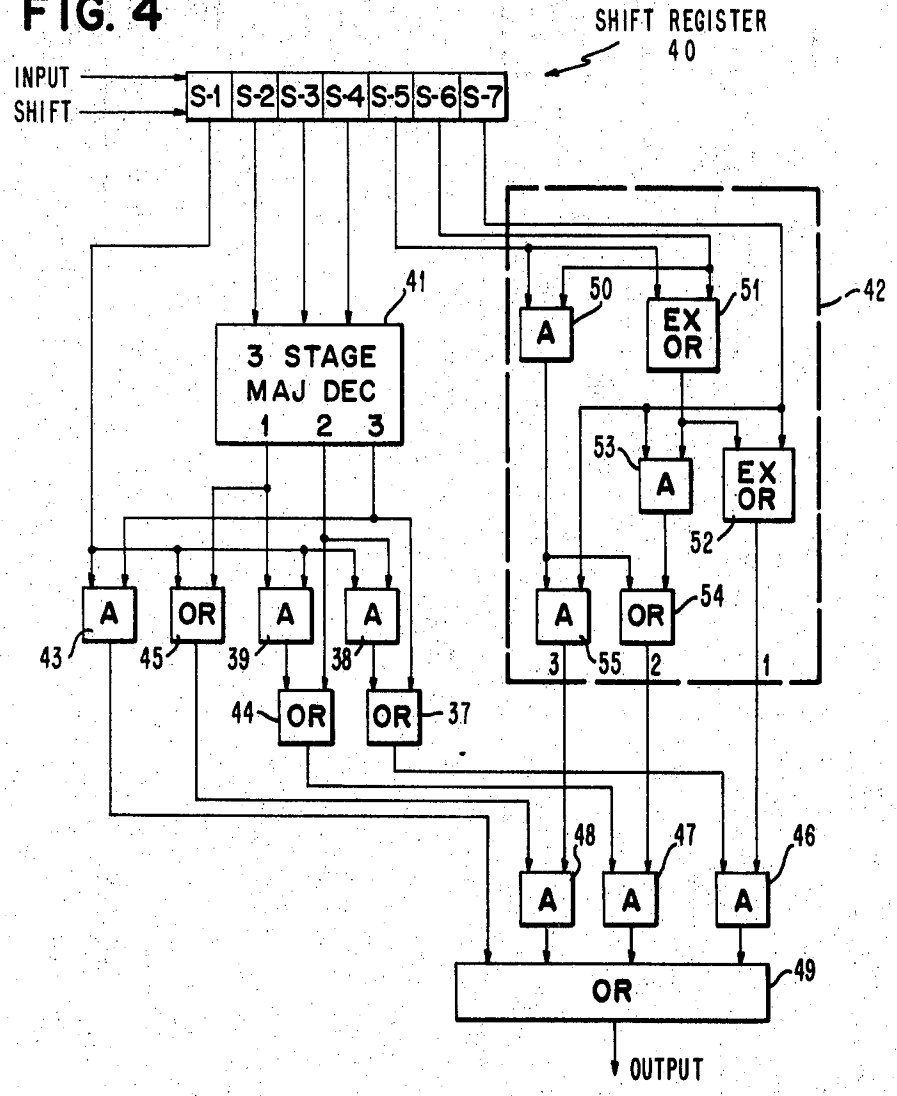
FIG. 4 shows a logic diagram of the digital majority decoder of FIG. 3.

With reference to FIG. 3, a second type of digital filter and smoothing circuit 16 is shown. This second type of digital filter and smoothing circuit 16 is comprised of a shift register 30 and a digital majority decoder 31. The digital majority decoder output will be a logical 1 whenever one-half or more of the *k* stages of shift register 30 contains 1's and a logical 0 whenever less than one-half of the *k* stages of shift register 30 contains 1's. FIG. 4 is an example of one type of digital majority decoder.

With reference to FIG. 4, the digital majority 31 is shown for example purposes to be a digital majority decoder for detecting the presence of majority of 1's in a 7-bit shift register 40. The digital majority decoder is partially composed of 3-stage majority decision circuits 41 or 42. A 3-stage majority detector 42 shows the logic necessary to decode the presence of one, two or three 1's in stages S1, 2 and 3 of the shift register 40 under interrogation. Since the shift register 40 has seven stages S1—7 the output of the 3-stage majority decision circuits 41 and 42 and one stage of shift register 40 must be interrogated for the presence of four or more 1's. The output of stage S1 of shift register 40 is combined with the output of the decoder 41 by means of AND circuits 38, 39, 43 and OR circuits 37, 44 and 45. The output of AND circuit 43 indicates that there are four 1's present in stages S1—4 of shift register 40 and therefore, is connected directly into OR circuit 49 which controls the output of the digital majority decoder 31. The output of OR circuits 44, 45 and 37 will all be logical 1's whenever the stages S1—4 under interrogation of shift register 40 contains at least one 1. The outputs of OR circuits 37 and 45 will all be logical 1's whenever the stages S1—4 of shift register 40 under interrogation contain at least two 1's. The output of OR circuit 37 will be a logical 1, whenever the stages S1—4 of shift register 40 under interrogation contain at least three 1's. The output of OR circuits 44, 45 and 37 are combined with the output of the decoder 42 by means of AND circuits 48, 47 and 46 for detecting the presence of all combinations of four or more 1's in all the stages of shift register 40. It can readily be realized that the output of OR circuit 49 will follow the condition of the majority of 1's within shift register 40 with a resolution equal to the shifting frequency which in this example is the clock frequency $f_c$ from stable clock oscillator 13.

OPERATION OF THE PREFERRED EMBODIMENT

FSK Mode

Figure 5:
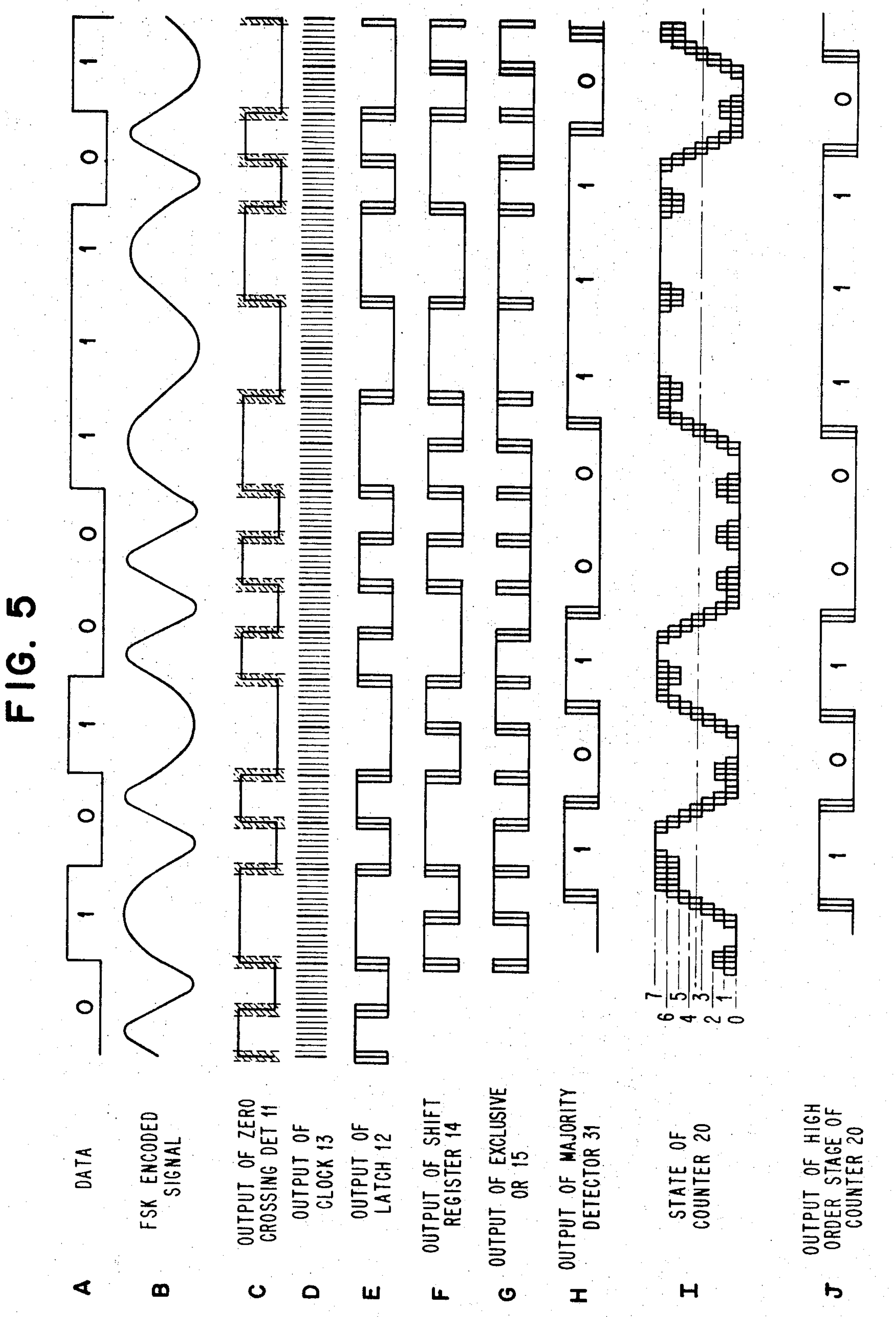
FIG. 5 (A—J) is a timing chart showing the operation of the FSK/PSK detector in a FSK environment.

With reference to FIG. 5, the operation of the digital FSK/PSK detector will be described in an FSK mode. Line A of FIG. 5 shows the data that was encoded at the transmitting station. Line B of FIG. 5 shows the FSK encoded signal as outputted from the receiver 10. The FSK signal is inputted to the zero crossing detector 11 and the output of the zero crossing detector 11 is seen in line C of FIG. 5. It should here be noted that the width of the leading and trailing edge of the pulses result from small amounts of frequency translations in the transmission lines and therefore, the zero crossing of the waveform may appear anywhere in between the width shown as the leading and trailing edges of the pulses. Also, not shown in line B, is the possible amplitude distortion of the FSK signal as transmitted over the communication lines. It should be noted that the output levels are established, independently by means of the zero crossing detector 11, of the amplitude of the input signal received.

Line D of FIG. 5 shows the clock frequency $f_c$ of the stable clock oscillator 13. It is desirous to have the clock frequency $f_c$ as high a frequency as design limitations will allow. Design limitations of the clock frequency will be discussed with regard to the digital delay lines. Line E of FIG. 5 shows the output of the time quantizer means which is the binary latch 12. It should be noted that the possible leading and trailing edges have been quantized to occur at specific times within the period of uncertainty with respect to the leading and trailing edges of the pulses as shown on line C of FIG. 5.

Line F of FIG. 5 shows the output of the digital delay line which is shift register 14. In this specific example, the frequency shift frequencies $f_1$ and $f_2$ are shown to be in a 2 to 1 ratio which is the most desirous condition since it allows maximum displacement of the two frequencies. The difference between $f_1$ and $f_2$ must be equal to or greater than one-half the data rate. Therefore, when the relationship between $f_1$ and $f_2$ is a 2 to 1 relationship, the delay time of the digit delay for shift register 14 is equal to $1/(2f(f_1-f_2))$. It should, therefore, be realized that the number of stages within shift register 14 will depend upon how fast the stages are shifted by the clock frequency $f_c$ of the stable clock oscillator 13. Further, that since the period of a frequency in inversely proportional to the frequency, the higher the frequency used, the shorter the amount of time between shift pulses to the shift register 14. Therefore, for a given time delay, if the clock frequency $f_c$ of clock oscillator 13 is increased the number of stages within shift register 14 must also be increased to keep the delay time a constant. Thus, the design limitation arises between the practicability of the number of stages of shift register 14 and the desirability to have the clock frequency $f_c$ of stable clock oscillator 13 as high as possible.

The output of latch 12 and shift register 14 are inputs to Exclusive-OR 15, which combines the two waveforms to produce the data waveform on line G of FIG. 5. From viewing line G of FIG. 5, it is clear that a requirement of further processing is needed. The requirement of further processing results from the practical consideration of having to operate the transmission line noise and the fact that value of the digital delay line employed in the detector cannot be exactly equal to half the reciprocal of the deviation since the transmitter and detector clock are not synchronized. To overcome the effects of the above factors, the output data signal from Exclusive-OR 15 is digital filtered by means of digital filter and smoothing circuit 16.

Line H of FIG. 5 shows the resulting waveform of passing the output data signal of the Exclusive-OR circuit 15 (line G, FIG. 5) through the digital filter and smoothing circuit comprised of a shift register 30 and digital majority decoder 31 as shown in FIG. 3. If the specific digital majority decoder 31 as shown in FIG. 4 was used, then the output of the Exclusive-OR circuit 15 would be evaluated for each position of a window by the majority of one within that window, the window consisting of seven consecutive clock pulses, as that window shifts one clock position at a time along the data waveform as shown on line G of FIG. 5. It can be shown that the data waveform of line H, FIG. 5 will result. It should further be noted that all noise has been eliminated from the data waveform except for the possible jitter to the leading and lagging of the data waveforms. It must be realized that waveforms E, F, G and H show the possible leading and lagging edges for the data waveform and in reality only one such leading and one such lagging edge will occur.

When the up-down counter-type of digital filter and smoothing circuit 16 is employed, the counter 20 will react as shown on line I of FIG. 5 if the counter is assumed to have three stages. The number of stages contained in the up-down counter is determined by the amount of time it is desired for the counter to go from 0 count to an all 1's count with a counting frequency of $f_c$. It is usually desired to have the counter to go from one extreme to the other in less than one-half the period of the highest frequency used for $f_1$ and $f_2$. The output of the counter 20 is taken from the highest order stage of the counter. If this is done, the resulting output waveform will be the data signal as shown on line J of FIG. 5. Here, notice once again, that the unwanted noise has been eliminated from the data waveform and that only the indeterminant position of the leading and lagging edge of the data pulses still exist.

PSK Mode

Figure 6:
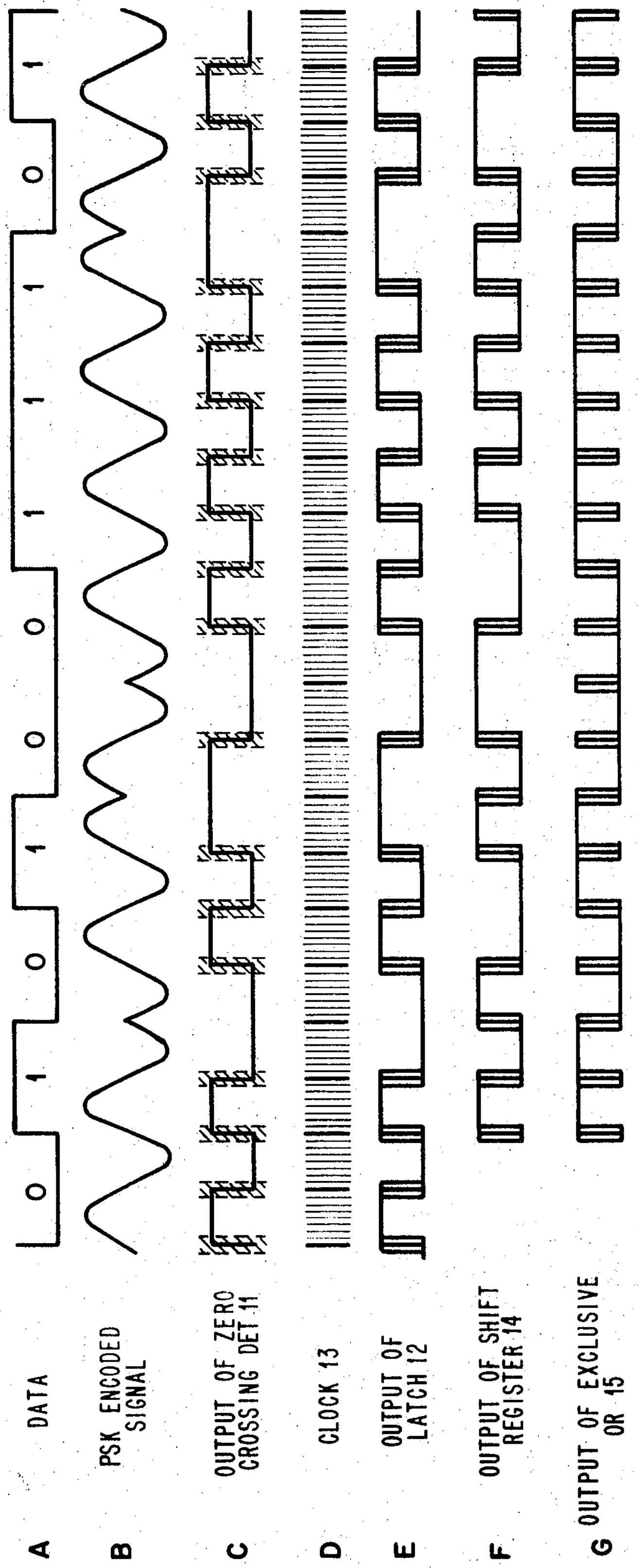
FIG. 6 (A—G) is a timing chart showing the operation of the FSK/PSK detector in a PSK environment.

The digital FSK/PSK detector will now be discussed with a PSK input signal. With reference to FIG. 6, a line A shows the data encoded at the transmitter. It should be noted that differential phase modulation has been used to encode the data signal using the general ground rules of:

a. 180° Phase Change = 0 b. 0° Phase Change = 1

The encoded data of line A of FIG. 6, therefore, will appear as an encoded signal as shown on line B of FIG. 6 which is inputted to the zero crossing detector 11. Line C of FIG. 6 shows the output of the zero crossing detector 11. Once again, the zero crossings may occur anywhere between the indicated limitations due to transmission delay and noise. The PSK signal can be degradated as to amplitude; but once again, the zero crossing detector reestablishes new binary levels independent of the amplitude of the received signal.

Line D of FIG. 6 shows the output of clock oscillator 13. It is as desirous in the PSK mode of operation to have the output frequency $f_c$ of the stable clock oscillator 13 as high as possible within the design limitations. Design limitations will again be discussed with respect to the digital delay.

Line E of FIG. 6 shows the output of the digital time quantizer means which is binary latch 12. The data waveform of line E of FIG. 6 indicates all the possible positions in which the leading and lagging edges of the data pulses may occur.

Line F of FIG. 6 shows the output of the digital delay line which is shift register 14. It is common when encoding binary data signals by the phase shift keyed method that the phase shift be 180°. Under such a condition of a shift of 180°, the delay of the digital delay line or shift register 14 is equal to one data time. The length of the delay accomplished by shift register 14 is dependent upon a number of stages within shift register 14 and the rate $f_c$ at which the stages are shifted. Here, once again the design compromise must be made between the length of the shift register and the choice of the clock frequency.

The waveform as shown on lines E and F of FIG. 6 are inputted to Exclusive-OR circuit 15. The output of Exclusive-OR circuit is shown on line G of FIG. 6. Here again, the output of Exclusive-OR circuit contains noise spikes plus the indecision position of the leading and lagging edges of the data pulses. Line G of FIG. 6 is comparable to the waveform of line G of FIG. 5. The action of the digital filter and smoothing circuit 16 with respect to the waveform of line G of FIG. 6 is the same as that which occurred to the waveform on line G of FIG. 5. A discussion as to the operation of the digital filter and smoothing circuit 16 for either of the up-down counter-type of FIG. 2 or the digital majority decoder-type of FIG. 3 is the same as the operation that occurred in a discussion of the FSK mode of operation of the digital FSK/PSK detector; and will, therefore, not be repeated here.

In general, it should be noted that either acting as a PSK or FSK detector, the digital PSK and FSK detector operates on an independent stable clock oscillator. The frequency of this stable clock oscillator should be that of the stable clock oscillator used for encoding purposes at the transmitter location. It should be stressed, however, that the clock oscillator of the receiver and the clock oscillator of the transmitter are not synchronized as to phase and therefore, the resulting clock pulses of the digital FSK/PSK receiver are independent of any time relationship with the transmitting source.

The digital implementation of a differential-coherent phase detector can be employed on either frequency or modulated signals whenever clipping of the input signal is allowable. This detector can further be used in particular advantage with 4-phase signals by the addition of a second, quadrature differential-coherent phase detector of similar design, except for the length of the delay shift registers. A register length longer by 45° equivalent phase shift at the center $1/(2\ (f_1-f_2))$ *of the incoming signal bandwidth should be selected for one detector, the other detector's register being lengthened by the same amount. The two output binary digits of the two detectors are independent may be provided either as separate binary outputs or be converted into serial binary signals.*

We claim:

1. A digital FSK/PSK detector comprising:
   - a binary amplitude quantizer means for receiving and establishing the amplitude of an FSK/PSK modulated signal;
   - a clock means;
   - a time quantizer means connected to the output of said binary amplitude quantizer means and to the output of said clock means for synchronizing said FSK/PSK modulated signal to said clock;
   - a digital delay means connected to the output of said time quantizer means and to the output of said clock means for delaying said FSK/PSK modulated signal;
   - an Exclusive-OR circuit having a first input connected to the output of said digital delay means and a second input connected to the output of said time quantizer means for detecting the data signal from said FSK/PSK modulated signal; and
   - a digital filter and smoothing means connected to the output of said Exclusive-OR circuit and to the output of said clock means for eliminating undesirable noise from said data signal.

2. A digital FSK/PSK detector as set forth in claim 1 wherein said binary amplitude quantizer is a zero crossing detector.

3. A digital FSK/PSK detector as set forth in claim 2 wherein said time quantizer means is a binary latch circuit.

4. A digital FSK/PSK detector as set forth in claim 3 wherein said digital delay means is an N-stage shift register.

5. A digital FSK/PSK detector as set forth in claim 4 wherein said digital filter and smoothing circuit further comprises an M-stage up-down counter and control circuitry, the output of said digital filter and smoothing circuit being the output of the highest order stage ($2^M$) of said up-down counter.

6. A digital FSK/PSK detector as set forth in claim 4 wherein said digital filter and smoothing circuit further comprises a *k*-stage shift register and a digital majority decoder, the output of said FSK/PSK detector being the output of said digital majority decoder, said output of said digital majority decoder being a 1 when one-half or more of said *k* stages of said *k*-stage shift register contains 1's and a 0 when less than one-half of said *k*-stages of said *k*-stage shift register contains 1's.